Jan. 31, 1956 W. C. WHITTUM 2,732,591
METHODS OF ROLLING SHEET MATERIAL
Filed July 5, 1950 2 Sheets-Sheet 1

Inventor
Warren C. Whittum
By
Blackwell, Bartholow
Attorneys

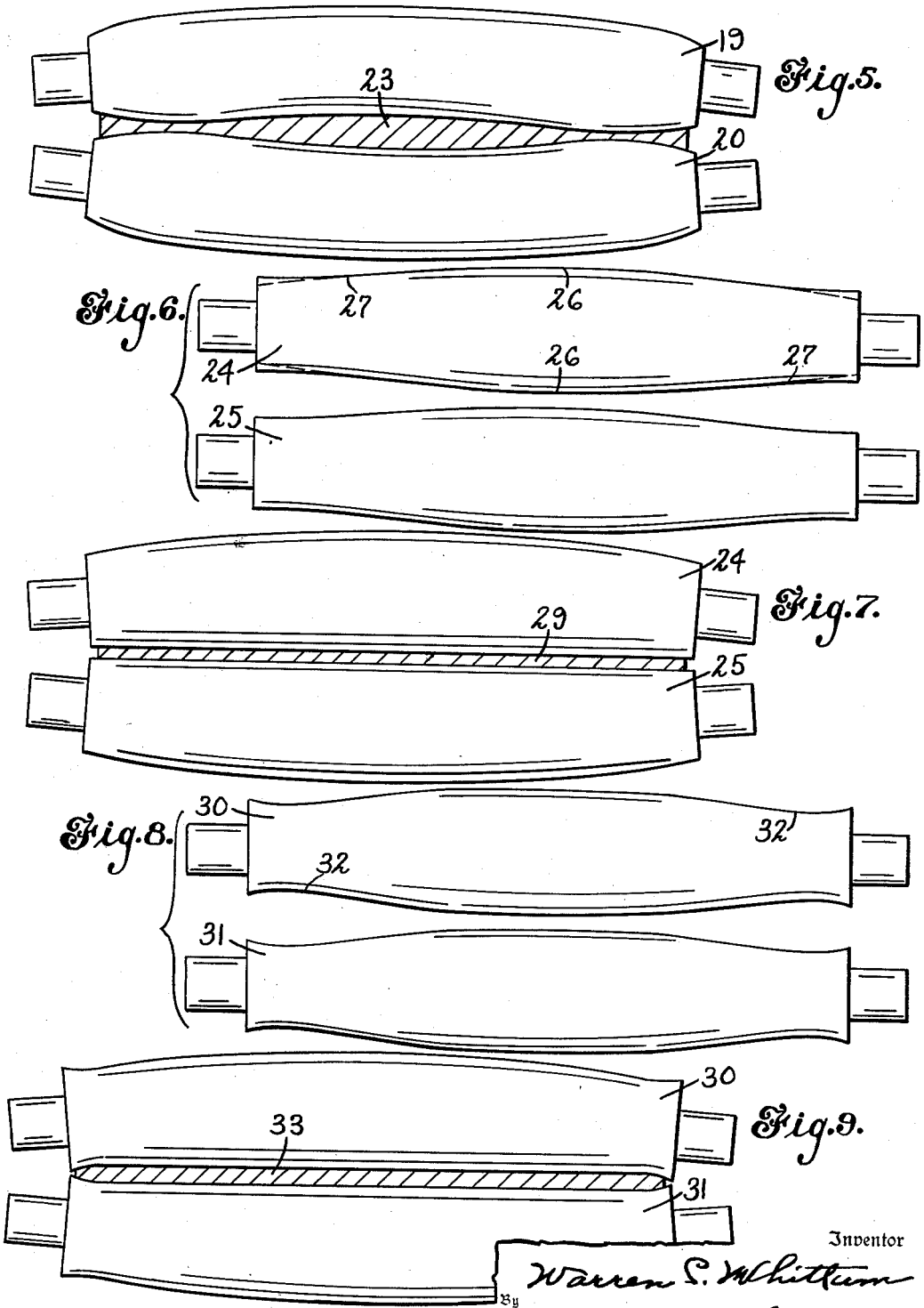

United States Patent Office 2,732,591
Patented Jan. 31, 1956

2,732,591

METHODS OF ROLLING SHEET MATERIAL

Warren C. Whittum, Ansonia, Conn., assignor to Farrel-Birmingham Company, Incorporated, Ansonia, Conn., a corporation of Connecticut Application July 5, 1950, Serial No. 172,056

1 Claim. (Cl. 18—55)

This invention relates to rolls for calenders or the like and more particularly to the manufacture or shaping of such rolls so that they may be employed in a calender or like machine to produce a sheet of material of uniform thickness under heavy pressure and under the conditions of temperature to which they will be subjected in work of this character. It will be understood that the rolls are not restricted to use with material of any particular type, but may be used for example for rolling sheets of plastic or any other resinous material such as rubber or paper, or any other material designed to be passed through sheeting or calender rolls.

When plastic material is passed through rolls to be delivered in the form of sheets it is usually essential that the sheet which is delivered be of uniform or substantially uniform thickness throughout its width and this uniformity must be maintained within very fine limits, so that it is essential that the roll surfaces between which the material is passed be substantially uniformly spaced from each other throughout the length of the rolls.

This uniform spacing is easily provided when the rolls are at rest. However, when the rolls are in use they are subjected to heavy pressure and as they are held at their ends against a separating movement by the roll journals, the spacing at the ends of the rolls will not vary. The pressure to which they are subjected is so heavy in many cases that they spring apart or bow at their central portions and thus the sheet of material is apt to be of greater thickness at this point than at its edges. This defect is usually remedied by manufacturing the rolls in the first instance with a crown or giving them a slightly larger diameter at their central portions than at their ends with a gradual taper toward their ends.

While shaping the rolls in this way has been fairly successful in overcoming the bowing of the rolls, it has also been determined that owing to the fact that the rolls develop a relatively high temperature in use there are also changes in diameter due to this temperature. Due to this fact, rolls which are of the proper shape to produce a sheet of uniform thickness at ordinary temperatures may not produce such a sheet at working temperatures. It has also been ascertained that the rolls do not reach the same temperature throughout their length, but reach a substantially uniform temperature throughout a large part of their lengths, the temperature, however, dropping off rather sharply toward the ends of the rolls. Thus the expansion of the roll in diameter due to the change in temperature from that existing when the rolls are idle to that existing when they are in operation will be considerably less adjacent the ends of the rolls than throughout the remaining portions thereof.

Thus, although the rolls may be given the proper crown to roll a uniform sheet, if no expansion due to temperature changes takes place, it will be found that in actual working conditions such rolls will produce a sheet substantially thicker toward the edges thereof than at its central portion.

One object of the present invention is to provide a method of rolling plastic material between cooperating rolls wherein the rolls are so shaped during the manufacture thereof that under actual working conditions of temperature and pressure the distance between a pair of cooperating rolls will be substantially constant throughout the width of the sheet of material delivered by the rolls.

A further object of the invention is to provide a method of rolling plastic material in a calender or like machine wherein the rolls are so shaped as to compensate not only for the pressure applied thereto under working conditions, but also for expansion in diameter due to differences in the temperature of the roll at various points along its length when idle and when in operation.

Still another object of the invention is to provide a method of rolling plastic material in calenders or like machines wherein the rolls will be provided with a crown or camber to compensate for the bowing of the central portion of the rolls under pressure, but which crown or camber will be modified toward the ends of the rolls so as to compensate for difference in expansion of the roll in service due to the fact that the roll temperatures will be less adjacent their end portions than over the remainder of their lengths.

To these and other ends the invention consists in the novel features and combinations of steps to be hereinafter described and claimed.

In the accompanying drawings:

Fig. 5 is a view similar to Fig. 3 but showing in somewhat exaggerated form the effect of unequal temperature changes upon the shape of the rolls and the cross-sectional shape of the sheet of material which issues from the roll bite;

Fig. 6 illustrates a pair of rolls (when idle) so shaped as to compensate for temperature changes in addition to changes due to load under working conditions;

Fig. 7 illustrates the action of the rolls of Fig. 6 under working conditions and the cross sectional form of the sheet of material issuing from the roll bite;

Fig. 8 is a view similar to Fig. 6 showing a pair of rolls of slightly modified form; and Fig. 9 is a view similar to Fig. 7 but showing the rolls of Fig. 8 under actual working conditions.

Figure 1:
Fig. 1 is a front elevational view of a calender of conventional form.

To illustrate a preferred structure for carrying out my invention, I have shown in Fig. 1 of the drawings a calender of conventional form which may comprise end frames 10 and 11 in which are rotatably mounted in journal boxes 12 and 13 upper and lower rolls 14 and 15. While the invention to be hereinafter described is of particular application in the manufacture of thin sheets of material, such as plastic film, it will be understood that it is equally applicable in the manufacture of sheets or films of other material where operating temperatures are such as to bring about a variation in the diameter of the rolls under working conditions as compared to that when the rolls are idle and cool.

In the manufacture of plastic film and thin sheets, it is important that the thickness of film or sheet be maintained within very close limits and while it may generally be assumed that such sheets or film will be of uniform thickness throughout their width, this is not always the case, as in practice it is uncommon to find that a sheet slightly thinner or thicker at its central portion is preferable to one which is absolutely flat. Such a variation, however, is usually extremely small.

Figure 2:
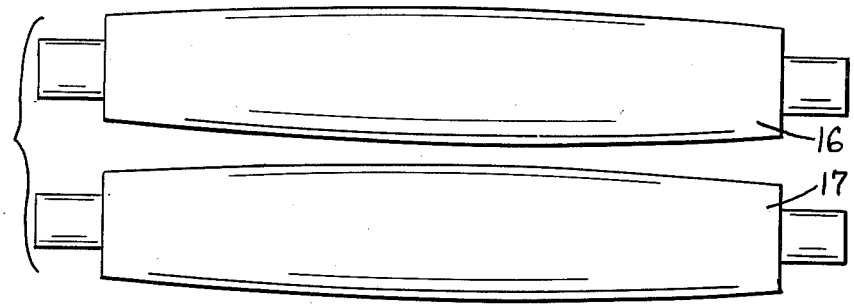
Fig. 2 is a diagrammatic front elevational view of a pair of cooperating calender rolls, these rolls having the usual or conventional crown to compensate for the bowing or the spreading of the rolls under load.

The rolls 14 and 15 of calendering devices are held against separation under considerable pressure. This pressure, however, is exerted only upon the roll necks, and as a result the pressure of the material passing through the rolls will be such as to cause them to spring apart or bow at their central portions. It has, therefore, been common in the manufacture of calender rolls to give them a conventional crown shape, such as shown, for example, by the shape of the rolls 16 and 17 of Fig. 2, this shape being based to all practical purposes upon the shape of a uniformly loaded beam supported at its ends, and while both rolls 16 and 17 are, as shown, provided with a substantially equal crown, it will be understood that the total roll crown may be divided in any portions between the two or placed entirely upon one of the rolls if desired. It is understood that in Fig. 2 of the drawings the rolls are shown as originally manufactured when not in operation.

Figure 3:
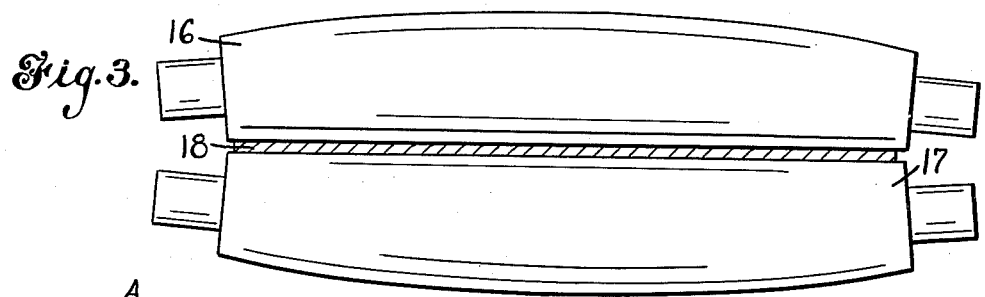
Fig. 3 is a diagrammatic view illustrating the shape under load of the rolls shown in Fig. 2 with a sheet of material between the rolls, it being assumed that the temperature of the rolls is unchanged.

When such rolls are placed in operation and a sheet of material is passed therethrough, the result is substantially that shown in Fig. 3 wherein the rolls 16 and 17 are shown as being bowed outwardly at their central portions, but the space between them is substantially uniform from end to end of the rolls as illustrated by the substantially even and uniform thickness of the sheet 18 being passed between them. This is the ideal condition and while the rolls are shown as being under load in this figure of the drawings, it is assumed that there has been no change in the shape thereof due to unequal changes in temperatures or, if there has been such a change, that it has been uniform throughout the length of the rolls.

Figure 4:
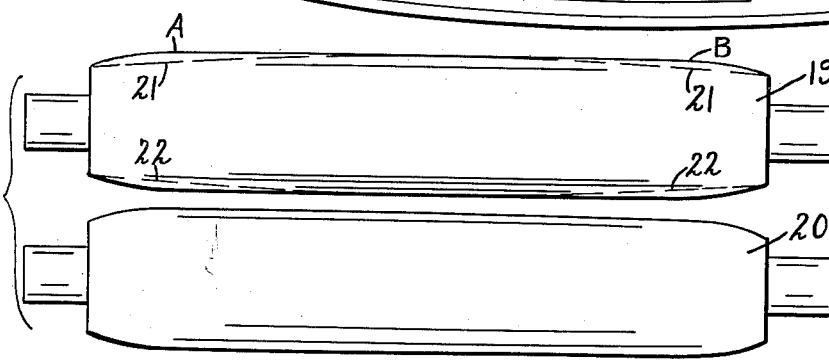
Fig. 4 is an elevational view of a pair of rolls showing the unequal expansion of the rolls from true cylindrical shape due to temperature change under working conditions.

It is found in practice, however, that there is a large increase in temperature of the rolls when they are in operation as compared to the temperature when idle. Moreover, this change in temperature is not uniform through the length of the rolls but is greatest between points spaced from the ends thereof and tends to decrease sharply beyond these points or adjacent the ends of the rolls. In other words, the temperature of the roll will be substantially uniform throughout a considerable area on each side of the center thereof, but will drop off rather sharply toward the roll ends. The result is that the change in the diameter of the roll on account of the expansion due to increase in temperature will be considerably less adjacent the roll ends than over the remainder of the roll length. This condition is shown in Fig. 4 of the drawings wherein the rolls 19 and 20 illustrate in somewhat exaggerated form the shape of the pair of rolls which have been subjected to heat, which rolls were originally, when cold, of uniform diameter throughout their lengths without being provided with the usual crown. It will be noted that these rolls are of substantially uniform diameter from their centers outwardly to approximately the points denoted by the letters A and B adjacent the ends thereof and that they taper off or decrease sharply in diameter from these points outwardly. The shape of a roll similar to the roll 19, but which has been provided with a continuous crown is shown by the dotted lines 21 and 22 so that, as will be seen, the roll 19 differs from the conventional crown shape by the amount of material between the lines 21 and 22 and the surface of the roll.

In Fig. 5 of the drawings there is shown in somewhat exaggerated form the action of the rolls 19 and 20 when under load or when rolling sheet material under heavy pressure. It will be seen that the rolls will be spread apart adjacent the central portions thereof and adjacent their extreme ends but their surfaces will approach each other between these points, resulting in the sheet of material 23 which will lack uniformity in thickness. This represents the shape of a sheet of material which would be delivered by straight uncrowned rolls when working at relatively high temperature and pressure; that is, temperature considerably above atmospheric temperature.

From inspection of Fig. 4, it will be apparent that if a straight roll or roll of uniform diameter is ground when cold so as to remove the material between the lines 21 and 22 and the exterior surface of the roll as shown by A and B in Fig. 4, the result would be such that, when the roll is operated under normal working conditions and thus subjected to a considerable increase in temperature, the expansion of the roll would be such that it would be provided with the desired crown. That is, under working conditions the roll would possess the conventional crown shape which has previously been given to the rolls when cold, but which shape these crowned rolls do not at the present time possess at the temperature accompanying their operation.

The above principles have been applied to the grinding of rolls according to the present invention, and the rolls thus produced are shown diagrammatically in Fig. 6 at 24 and 25. It will be apparent that these rolls are provided with a crown or enlarged portion between the ends thereof as shown at 26, and, from the central portion of the roll, the surfaces taper, over a curve, toward the roll ends. However, this taper does not continue uniformly to the roll ends, but is flattened out at substantially the points 27, and from these points to the ends of the roll the diameter may be substantially constant. In other words, an element of the surface of the roll or a line drawn on such surface parallel to the axis might be substantially straight or with a very flat curve for some distance from the end of the roll and then be curved from that point to the center of the roll to give it its desired crown. In Fig. 7 of the drawings the operation of such rolls is shown, wherein it is seen that, under the conditions of pressure and temperature by which the operation is accompanied, the space between them will be substantially uniform and they will roll a substantially flat sheet 29. The exact shape of the rolls 24 and 25 will depend, of course, upon the temperature and pressure to which they are designed to be subjected, but, as the working temperature will also be less adjacent the roll ends than at other points along the length, the taper or crown will in no case be continued uniformly to the end of the roll.

As a matter of fact in some instances it may be desirable to so grind the rolls that an element on the surface of the roll constitutes a reverse curve instead of a combination of a curved portion and a relatively flat portion. Such an instance is shown in Fig. 8 of the drawings where the rolls 30 and 31 are given a crown, similar to that of the rolls 24 and 25, from their center portions outwardly to approximately the point 32. From this point to the end of the roll the latter is enlarged slightly so that the surface of the roll may be said to be of "ox-bow" shape, the diameter being slightly larger at the extreme ends than at a point inwardly from the ends and then again becoming larger at the roll centers.

The operation of a pair of rolls of this shape is shown in Fig. 9 wherein it is seen that the sheet 33 is substantially flat except at its edge portions. This will not, however, be detrimental as a practical matter as usually the edge portions of a sheet are trimmed and this trimming operation will remove the thinner edge portions of the sheet leaving only the width of uniform thickness. Such a roll shape has its advantages in that the material will be confined between the rolls and will be prevented from being extruded from the ends thereof.

It will be understood that considerable variation may be made in the exact shape of the finished rolls, but in any event according to the present invention the material removed from the rolls by grinding to give them the proper shape will always be controlled by the expansion that will occur in roll diameter at varoius points along the axis of the roll, taking into consideration the temperature which will exist in the roll under operating conditions.

It will be apparent, therefore, that, assuming that the roll as originally made is of true cylindrical form, its surface will be ground to remove metal from the roll in order to give it the desired shape, and as the ends of the roll will always be smaller than the central portion it has usually been the practice to gradually remove increasing amounts of the metal from the center toward the roll ends. According to the present method, however, in order to compensate for the smaller amount of expansion at the roll ends due to the lower temperatures of the rolls existing at the ends, less metal will be removed from the portions of the roll adjacent the ends than has previously been the case. Under ideal conditions the differences between the amount of metal which has heretofore been removed from the rolls and that which is removed according to the present invention would be equal to the difference between the expansion in roll diameter at different points in the length thereof due to unequal temperatures under working conditions.

It will be understood that the crown shape with which rolls have been manufactured in the past varies according to conditions, and therefore the difference between the diameter of such a roll at its center and that at its ends may vary to a considerable extent. For example, the amount of crown may vary from .002 of an inch to .012 of an inch or even more. That is, the diameter of a roll at its center may exceed the diameter of a roll at its end portion by .012 of an inch or more. This difference in diameter gradually decreases toward the ends of the roll. This tapering of the roll toward its ends, however, is not a straight-line taper but rather a curved taper, the shape approximating that of a uniformly loaded beam, as stated above.

For example, a typical crown given to a 24-inch roll, 70 inches long, at points every 7 inches along its length may be as follows:

| Distance from one end of roll | Increase in Diameter |
|---|---|
| Inches | Inches |
| 0 | 0 |
| 7 | .0031 |
| 14 | .0060 |
| 21 | .0089 |
| 28 | .0095 |
| 35 | .0100 |
| 42 | .0095 |
| 49 | .0089 |
| 56 | .0060 |
| 63 | .0031 |
| 70 | 0 |

A roll of the same dimensions shaped according to the present invention might, for example, vary from the true cylindrical shape as follows:

| Distance from one end of roll | Increase in Diameter |
|---|---|
| Inches | Inches |
| 0 | 0 |
| 7 | .0010 |
| 14 | .0035 |
| 21 | .0065 |
| 28 | .0090 |
| 35 | .0100 |
| 42 | .0090 |
| 49 | .0065 |
| 56 | .0035 |
| 63 | .0010 |
| 70 | 0 |

It will also be understood that in some instances rolls have been manufactured with a "negative" crown, or slightly concave in shape, being smaller at their central portions than at their ends. The reverse curve effect of the present invention described above is also applicable to such rolls in that the correction for changes in roll diameter due to temperature differentials along the length of the roll is superimposed either upon any crown or any concavity that would normally be required. In any case, the roll, when cold, would be ground proportionately larger at points where the rise in temperature would be smaller.

While I have shown and described a preferred method of carrying out my invention, it will be understood that it is not to be limited to all of the details shown, but is capable of modification and variation within the spirit of the invention and within the scope of the claim.

What I claim is:

The method of rolling sheet material which comprises passing the material between closely spaced rolls under pressure, each of said rolls being generally of crown shape but said shape being modified by an amount substantially equal to the differential expansion of the diameter of the roll at points along its length due to the differences of temperature at said points under working conditions whereby the distance between the roll surfaces is maintained substantially constant under changes in temperature during the operation and under pressure to which the rolls are subjected.

References Cited in the file of this patent

UNITED STATES PATENTS

| | | |
|---|---|---|
| 242,532 | Hallett | June 7, 1881 |
| 444,746 | Evans | Jan. 13, 1891 |
| 831,727 | Loomis | Sept. 25, 1906 |
| 856,885 | Kubler | June 11, 1907 |
| 2,187,250 | Sendzimir | Jan. 16, 1940 |
| 2,671,296 | Geyer | Mar. 9, 1954 |

FOREIGN PATENTS

| | | |
|---|---|---|
| 268,705 | Great Britain | Apr. 7, 1927 |